United States Patent [19]

Katritzky et al.

[11] Patent Number: 4,659,801

[45] Date of Patent: Apr. 21, 1987

[54] THIAZOLINETHIONE-CONTAINING POLYMER

[75] Inventors: Alan R. Katritzky, Gainesville, Fla.; Steven M. Heilmann, N. St. Paul, Minn.; Larry R. Krepski, White Bear Lake, Minn.; Jerald K. Rasmussen, Stillwater, Minn.; Richard D. Tarr, Gainesville, Fla.

[73] Assignee: Minnesota Mining and Manufacturing Company, St. Paul, Minn.

[21] Appl. No.: 807,351

[22] Filed: Dec. 10, 1985

[51] Int. Cl.[4] ................................................ C08G 73/06
[52] U.S. Cl. ..................... 528/226; 528/125; 528/128; 528/220; 528/377
[58] Field of Search ............... 528/226, 125, 128, 220, 528/377

[56] References Cited

U.S. PATENT DOCUMENTS 2,609,373  9/1952  Beaver ................................. 528/377
3,355,426  11/1967  Craven ............................... 528/226
3,367,779  2/1968  Nakazawa et al. ................. 96/101

OTHER PUBLICATIONS

Chem. Abstr., 87, 24091c (1977).
Chem. Abstr., 74, 81769k (1971).
Chem. Abstr., 68, 17421q (1968).
Chem. Abstr., 68, 17432u (1968).
Chem. Abstr., 74, 70255p (1971).
Chem. Abstr., 96, 226521q (1982).
Chem. Abstr., 80, 15393f (1974).
Chem. Abstr., 85, 63891s (1976).
Chem. Abstr., 88, 74774r (1978).

*Primary Examiner*—Harold D. Anderson
*Attorney, Agent, or Firm*—Donald M. Sell; James A. Smith; Lorraine R. Sherman

[57] ABSTRACT

Novel polymers contain the [3H]-thiazole-2-thione ring system in the polymeric backbone. In another aspect, a method for preparing the poly(thiazolinethione) compounds is disclosed. The polymers are useful in the photographic arts.

18 Claims, No Drawings

THIAZOLINETHIONE-CONTAINING POLYMER

FIELD OF THE INVENTION

This invention relates to polymers containing the [3H]-thiazole-2-thione ring system and methods for their preparation. The polymers are useful in the photographic arts.

BACKGROUND OF THE INVENTION

Photographic elements are often composed of many layers of photosensitive and non-photosensitive materials, with each layer making a unique contribution to achieve a high degree of image quality. In color photography especially, the number of emulsion-applied layers is often considerable, with, in addition to one or more layers being deposited to define the proper level for each of the primary colors, layers being present that are responsible for performing antihalation, filtering, barrier, antistatic, and antiblocking functions. These layers function more or less independently, and it is important that the various components of the layers not migrate into neighboring layers. If migration occurs, the loss of the component not only diminishes overall performance of the function for which it was intended, but the migrated component also can interfere with the function of neighboring layers into which it has migrated. Migration is a serious problem in photography.

The [3H]-thiazole-2-thione heterocycle (I),

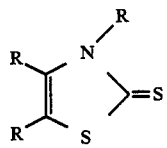

also referred to as a [3H]-thiazoline-2-thione and hereinafter referred to as thiazolinethione, is known to be extremely useful in the photographic industry. For example, certain low molecular weight thiazolinethione compounds form light-sensitive silver complexes which are useful in coatings for photographic paper (Fr. Demande 2,019,578; Chem. Abstract., 74, 81769k (1971)). Derivatives of (I) have been disclosed to be useful when added to silver halide emulsions to enhance a black tone of an image and to increase the photosensitivity (Brit. 1,086,657; Chem. Abstr., 68, 17421q (1968)). Additional applications of thiazolinethiones in the photographic industry are as desensitizers for direct positive photography. Derivatives of (I), used as silver halide emulsion additives, were disclosed to exhibit more controlled coloring and contrast of photographic materials (Brit. Pat. No. 1,086,613; Chem. Abstr., 68, 17432u (1968); U.S. Pat. No. 3,367,779). Thiazolinethione compounds (I) have also been disclosed to be useful as emulsion additives to reduce fogging during the storage of photographic materials (Fr. Demande No. 2,019,603; Chem. Abstr., 74, 70255p (1971)) and to prepare photographic emulsions having low visible light sensitivity, high UV sensitivity, and low fog (Jpn. Kokai Tokkyo Koho JP No. 81,149,031; Chem. Abstr., 96, 226521q (1982)). However, utility of the thiazolinethione compounds is diminished in certain instances due to its capability of migrating among the layers in a photographic element.

The prior art has disclosed polymers which incorporate the thiazolinethione heterocycle as a pendant group. These have been obtained by copolymerizing N-vinylbenzothiazole-2-thione (II) or N-allylbenzothiazole-2-thione (III) with methyl methacrylate (M. A. Askarov, A. S. Bank, et al., J. Polym. Sci., Polym. Symp., No. 40, 199 (1973), Chem. Abstr., 80, 15393f (1974); Uzb. Khim. Zh., 56 (1976), Chem. Abstr., 85, 63891s (1976); Deposited Doc., VINITI, 529 (1976), Chem. Abstr., 88, 74774r (1978); Vysokomol Soedin., Ser. B., 19, 255 (1977), Chem. Abstr., 87, 24091c (1977)). The copolymers had greater light and heat stabilities than methyl methacrylate homopolymer.

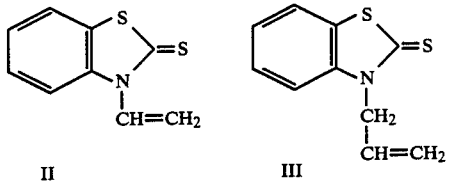

II    III

It is believed that the prior art does not teach the thiazolinethione heterocycle incorporated into the backbone of a polymer.

SUMMARY OF THE INVENTION

Briefly, the present invention provides polymers in which the thiazolinethione heterocycle is incorporated into the polymer backbone.

In another aspect, the present invention provides a process for preparing the novel poly(thiazolinethione) compounds. The novel process comprises the steps:
 (i) allowing a bis(dithiocarbamate salt) and a bis(alpha-haloketone) to react to form a polymer containing units selected from the group consisting of 4-hydroxythiazolidine-2-thione, 4-hydroxythiazolidine-2-thione/thiazolinethione, and thiazolinethione;
 (ii) treating the polymer of step (i) with aqueous acid to provide the poly(thiazolinethione), and
 (iii) isolating the resulting poly(thiazolinethione).

In general, the polymers which are formed in step (i) contain a majority of 4-hydroxythiazolidine-2-thione heterocyclic units but also may contain 4-hydroxythiazolidine-2-thione/thiazolinethione heterocyclic units and thiazolinethione heterocyclic units. Treatment of the polymer with acid in step (ii) causes dehydration of the 4-hydroxythiazolidine-2-thione heterocycles to thiazolinethione heterocycles.

As mentioned above, the thiazolinethione heterocycle has found extensive use in the photographic industry, always as a low (i.e. less than 500) molecular weight derivative. When low molecular weight compounds are used as components in one particular layer of a multilayered photographic material, migration of these components into neighboring layers can occur and adversely affect the performance of the photographic material. By incorporating the heterocyclic compound into a polymer, this migration problem can be reduced or eliminated.

In this application:
 "polymer" means a compound having at least three repeating units;
 "backbone" means in the main chain of a polymer, not as a pendant group; and
 "aryl" and "arylene" mean the mono- and divalent radicals, respectively, of an aromatic or heteroaromatic compound which can consist of one ring or two or more fused or catenated rings.

DETAILED DESCRIPTION

The present invention provides a polymer comprising units having the formula

IV novel polymers of the invention can be in the range of about 500 to about 30,000, preferably 1,000 to 25,000.

As mentioned above, the polymers of the invention can be prepared by a novel process, the steps of which are shown in the Flow Chart below, wherein A, B, R, and n are as defined above and M and X are as defined below.

FLOW CHART

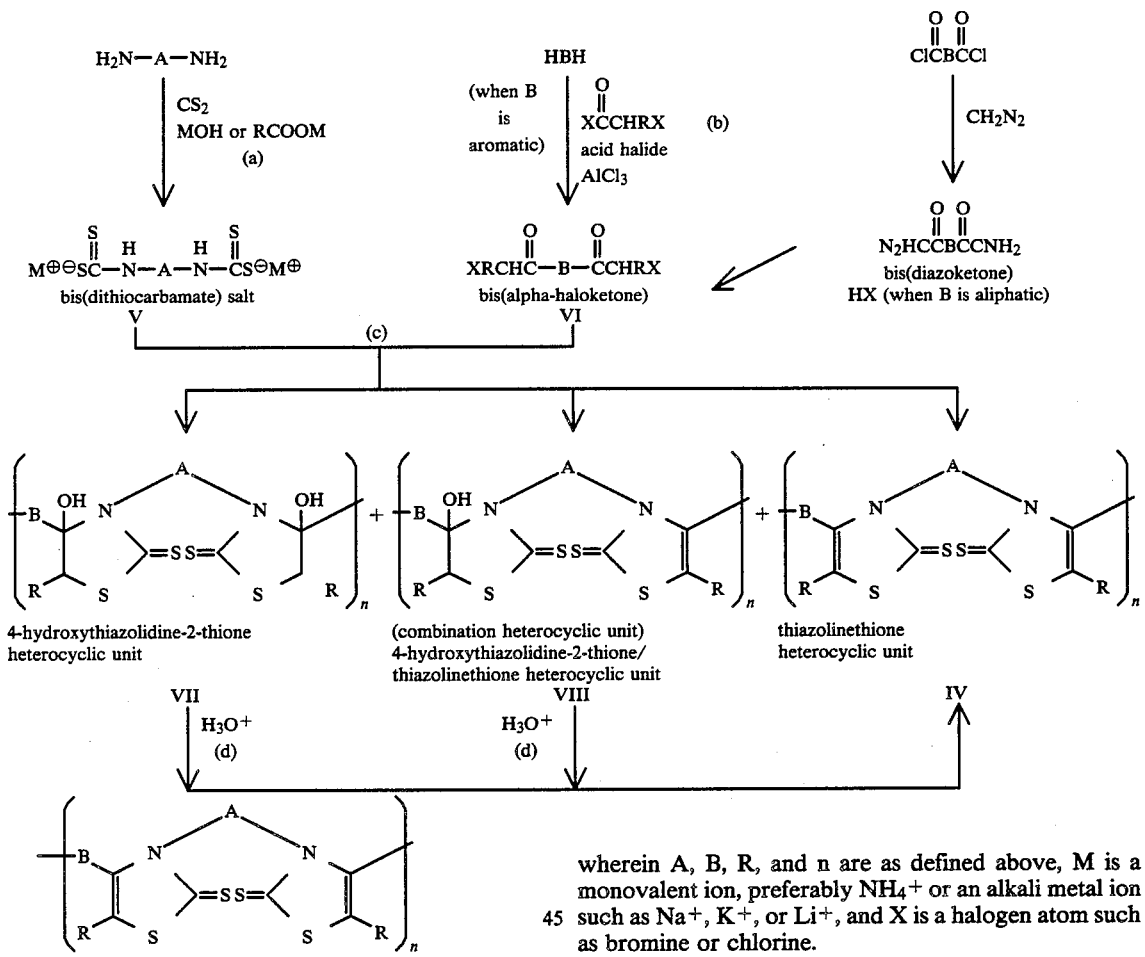

wherein

A and B independently can be any divalent organic bridging group, preferably an alkylene group having 2 to 20 carbon atoms, or an arylene group having 6 to 20 carbon atoms, all of which, optionally, can be interrupted by 1 to 5 nonconnected heteroatoms of oxygen, nitrogen, silicon, or sulfur (heteroatoms being separated from each other by one or more carbon atoms), R can be hydrogen, an alkyl or an alkoxyalkyl group of 1 to 20 carbon atoms, or an aryl, aralkyl, alkaryl, or alkoxyaryl group of 6 to 20 carbon atoms, and n can an integer of 3 to 100, preferably 5 to 100.

The poly(thiazolinethiones) of the invention are generally soluble in polar organic solvents such as dimethylsulfoxide (DMSO), dimethylformamide (DMF), N-methylpyrrolidone (NMP), and dimethylacetamide (DMA). The polymers can be efficiently fabricated into the final application configuration, such as a thin layer or a coating, by conventional methods such as solution coating and melt processing. Molecular weights of the wherein A, B, R, and n are as defined above, M is a monovalent ion, preferably $NH_4^+$ or an alkali metal ion such as $Na^+$, $K^+$, or $Li^+$, and X is a halogen atom such as bromine or chlorine.

Step (a)

Bis(dithiocarbamate salts) (V) are known in the art and are conveniently prepared as outlined by M. Bogemann, et al., in "Houben Weyl Methoden der Organischen Chemie", Vol. 9, Georg Thieme Verlag, Stuttgart, Germany, p. 870 (1955), from the reaction of diamines with carbon disulfide and a base such as a metal or ammonium hydroxide as illustrated in Equation (1):

Equation (1)

V wherein the bridging group A can be any divalent organic group such as alkylene groups having from 2 to 20 carbon atoms and arylene groups having from 6 to 20 carbon atoms and, optionally, can be interrupted by one to five nonconnected heteroatoms of oxygen, nitrogen, silicon, or sulfur (heteroatoms being separated from each other by one or more carbon atoms). Further, A can optionally be substituted with groups that do not undergo reactions with the dithiocarbamate salt group or with carbon disulfide or be altered by the alkaline conditions of the process. Suitable substituents include ether groups such as alkoxy of 1 to 20 carbon atoms or aryloxy of 6 to 20 carbon atoms. M is a monovalent ion (e.g., an ammonium ion or an alkali metal ion such as $Na^+$, $K^+$, or $Li^+$).

Step (b)

The bis(alpha-haloketones) of step (b) are shown in the Formula (VI) below

VI wherein X can be a bromine or chlorine atom, R can be hydrogen, an alkyl or an alkoxyalkyl group of 1 to 20 carbon atoms, or an aryl, aralkyl, alkaryl, or alkoxyaryl group of 6 to 20 carbon atoms; preferably R is hydrogen, methyl, ethyl, hexyl, octyl, dodecyl, or phenyl, and the bridging group B can be any divalent organic group such as an alkylene group having from 2 to 20 carbon atoms or arylene group having from 6 to 20 carbon atoms, all of which, optionally, can be interrupted by one to five heteroatoms of oxygen, silicon, nitrogen, or sulfur (heteroatoms being separated from each other by one or more carbon atoms). The bridging group B is preferably an arylene group as depicted in Formula (IX) below,

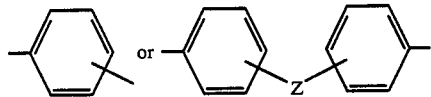

IX wherein the bridging group Z can be a single bond, —O—, —S—, —SO$_2$—,

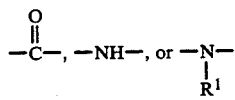

wherein $R^1$ is a $C_1$ to $C_4$ alkyl group, any divalent organic group such as an alkylene group having from 1 to 20 carbon atoms, or an arylene group having from 6 to 20 carbon atoms and the alkylene or arylene groups, optionally, can be interrupted by one to five heteroatoms of oxygen, silicon, nitrogen, or sulfur (heteroatoms being separated from each other by one or more carbon atom). It is preferable for the bridging group B to be an arylene group since in these cases the bis(alpha-haloketone) (VI) can be readily prepared by Friedel-Crafts acylation as outlined in Higgens et al., *J. Poly. Sci.*, (Pt. A-1), 9, 763 (1971), and by Longone et al., *J. Poly. Sci.*, (Pt. A, 3), 3117 (1965). The preparation of a bis(alpha-haloketone)(VI), wherein B is an aliphatic group and R is hydrogen, is described by V. H. Schubert et al., *J. Prakt. Chem.*, 24, 132–142 (1964).

Step (c)

In step (c) the bis(dithiocarbamate salt) (V) of step (a) is allowed to react with the bis(alpha-haloketone) (VI) of step (b) to generate a polymer containing a mixture of the 4-hydroxythiazolidine-2-thione heterocyclic units, thiazolinethione units, and combination units of these two heterocycles. The reaction conditions involve adding equimolar amounts of the bis(dithiocarbamate salt) (V) and the bis(alpha-haloketone) (VI) to a polar organic solvent such as dimethylsulfoxide (DMSO), dimethylformamide (DMF), N-methylpyrrolidone (NMP), or dimethylacetamide (DMA), and stirring the reaction mixture for 48 hours at a temperature between 20° C. to 80° C. The reaction is shown schematically in the Flow Chart above.

An alternative method for preparing the polymer of step (c) consists of generating the bis(dithiocarbamate salt) (V) in ethanol or DMF from the reaction of a diamine, carbon disulfide and a carboxylic acid salt such as sodium, potassium, or lithium acetate, propionate, or benzoate, and then adding an equimolar amount of the bis(alphahaloketone) (VI) and stirring the reaction mixture for 48 hours.

Step (d)

The polymer formed in step (c) contains mainly the 4-hydroxythiazolidine-2-thione heterocyclic unit as depicted in Formula (VII) but may also contain some heterocyclic units of Formulas (IV) and (VIII) where dehydration has occurred to generate the thiazolinethione heterocyclic unit (IV) or the partially dehydrated heterocyclic unit of Formula (VIII). If it is desired to isolate this polymer containing mainly the 4-hydroxythiazolidine-2-thione heterocyclic units, this can be easily accomplished by pouring the reaction mixture from step (c) into about 5 to 10 volumes of water. The polymer is insoluble in the aqueous media, precipitates, and can be isolated by filtration. In step (d), the dehydration of the remaining 4-hydroxythiazolidine-2-thione units is accomplished by pouring the polymer solution of step (c) onto crushed ice containing an acid of pH 6 or less. Suitable acids include hydrochloric, nitric, sulfuric, acetic, and many others. The polymers are insoluble in aqueous acid, precipitate, and can be isolated by simple filtration or decantation of the aqueous supernatant liquid. Dehydration of the remaining 4-hydroxythiazolidine-2-thione heterocyclic units to the thiazolinethione heterocyclic units is accomplished by suspending the polymer in ethanol or other water-miscible solvent containing an acid of the type specified above and heating the mixture at reflux for 2 to 48 hours. This dehydration to form the thiazolinethione polymers of Formula (IV) is shown schematically in the Flow Chart.

Step (e)

The solid thiazolinethione polymers which result from step (d) above are insoluble in the acidic media and can be isolated by simple filtration or decantation of the supernatant liquid. The precipitated polymer is then washed with a non-solvent such as ethanol or ether and dried.

Preferred are those polymeric units of Formula (IV) wherein

A is dimethylene, trimethylene, tetramethylene, hexamethylene, octamethylene, dodecamethylene, meta-phenylene, para-phenylene, meta-phenylenebis(methylene), or para-phenylenebis(methylene).

Preferred are those polymeric units of Formula (IV) wherein

B is trimethylene, tetramethylene, hexamethylene, octamethylene, para-phenylene, para, para'-biphenylene, para, para'-oxydiphenylene, para, para'-sulfonyldiphenylene, para, para'-thiodiphenylene, and para, para'-methylenediphenylene.

Representative polymeric units containing thaizolinethione heterocycles of the present invention, wherein n is as defined above, include:

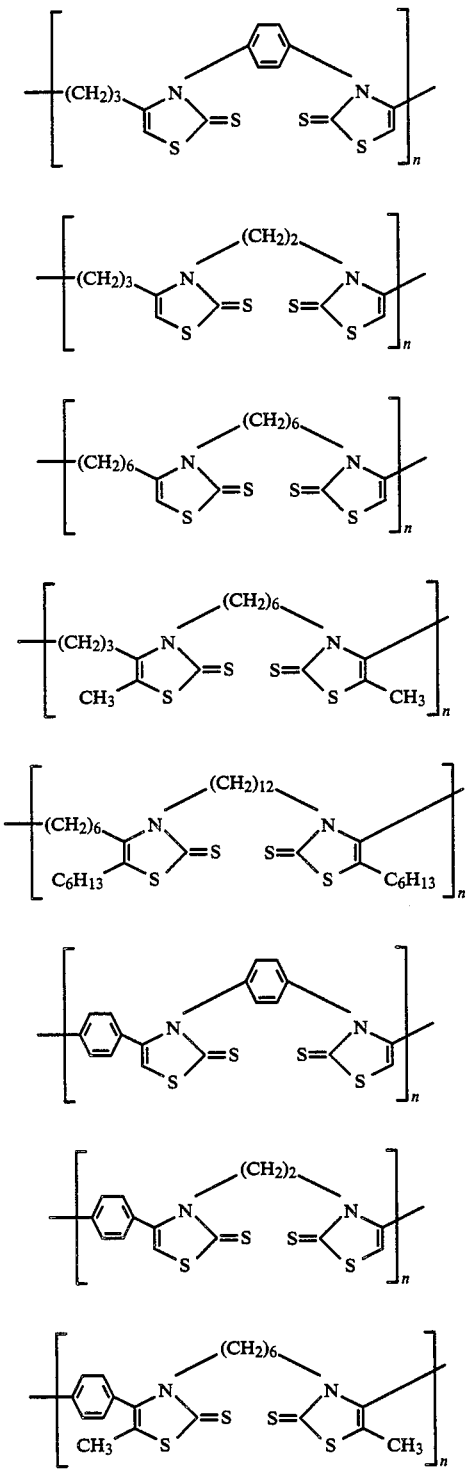

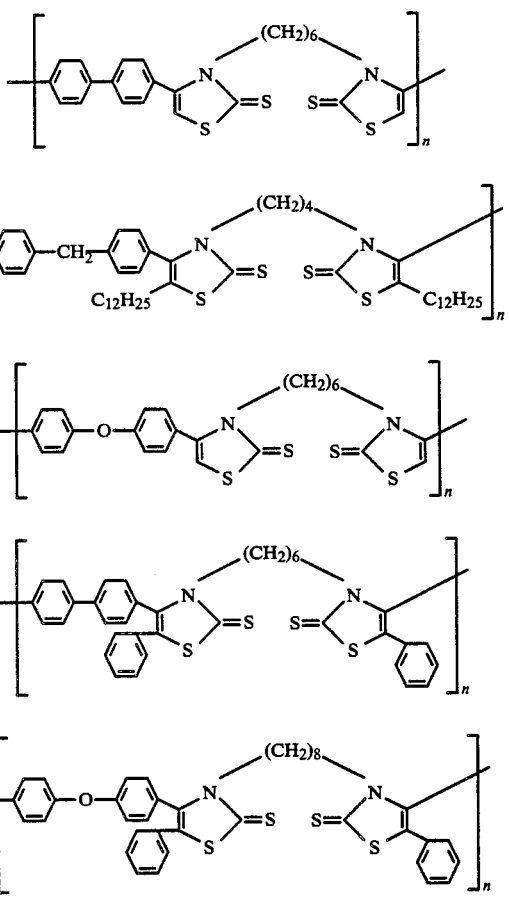

The thiazolinethion-containing polymers of the invention are useful as non-migrating components in photosensitive materials. They can have utility to enhance photosensitivity, contrast or the black tone of an image, and as antifoggants. The thiazolinethion-containing polymers can be included in emulsions or with other resinous materials or can be coated out of polar organic solvents by methods known in the art such as roll-coating, dip-coating, bar-coating, knife-coating, etc.

Objects and advantages of this invention are further illustrated by the following examples, but the particular materials and amounts thereof recited in these examples, as well as other conditions and details, should not be construed to unduly limit this invention.

EXAMPLE 1

Polymerization of Potassium 1,6-bis(dithiocarbamato)hexane and 4,4'-Bis(bromoacetyl)biphenyl Step (a): Preparation of potassium 1,6-bis(dithiocarbamato)hexane.

Carbon disulfide (200 g, 2.6 mole) was added over a 3 h period to 1,6-hexamethylenediamine (150 g, 1.3 mole) and potassium hydroxide (146 g, 2.6 mole) in water (250 mL). The reaction was stirred for 15 h and the product was filtered and washed by stirring in acetone (2.0 L). Yield 366.7 g (82%) white plates (95% ethanol) m.p. 335° C. (dec).

Analysis. Calcd. for $C_8H_{14}N_2S_4K_2$ (344.68): C, 27.88%; H, 4.09%; N, 8.13%. Found: C, 28.21%, H, 4.15%; N, 8.01%.

Step (b): Preparation of 4,4'-bis(bromoacetyl)biphenyl.

Biphenyl (31 g, 0.20 mole), aluminum chloride (80 g, 0.60 mole), 2-bromoacetyl bromide (121 g, 0.60 mole) and carbon disulfide (500 mL) were refluxed for 4 h and the carbon disulfide decanted. The product was hydrolyzed with crushed ice (500 g)/conc. hydrochloric acid (100 g), filtered and dried in vacuo. Yield 67.7 g (80%), tan needles (ethyl acetate), m.p. 218°–219° C.

Steps (c), (d) and (e): Preparation and isolation of the poly(thiazolinethione) derived from potassium 1,6-bis(dithiocarbamato)hexane and 4,4'-bis(bromoacetyl)biphenyl.

A solution of potassium 1,6-bis(dithiocarbamato)hexane (6.89 g, 20 mmol) and 4,4'-bis(bromoacetyl)biphenyl (7.92 g, 20 mmol) was stirred in DMF (100 mL) for 48 h at 80° C. The solution was then poured onto crushed ice (500 g) containing concentrated hydrochloric acid (50 mL). The precipitated polymer was filtered, washed with water and finally ethanol. The polymer was suspended in ethanol (150 mL) containing concentrated hydrochloric acid (15 mL) and the mixture refluxed for two hours. The polymer was collected by filtration, washed with ethanol and dried overnight at 50° C. under vacuum (less than 1 torr). Yield: 9.3 g. Spectroscopic analysis confirmed the presence of the desired poly(thiazolinethione). The inherent viscosity of the polymer at 30° C. in DMF (0.5 g/100 mL) was 0.18 dL/g.

EXAMPLES 2–5

Using the procedure of Example 1, the various polymers shown in Table I were prepared.

TABLE I

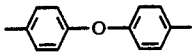

| Example | A | B | R | $\eta_{inh}^{(a)}$ |
|---|---|---|---|---|
| 2 | $(CH_2)_2$ | —⌬—O—⌬— | H | 0.04 |
| 3 | $(CH_2)_6$ | —⌬—O—⌬— | H | 0.11 |
| 4 | $(CH_2)_2$ | —⌬—⌬— | H | 0.04 |
| 5 | $(CH_2)_3$ | —⌬—⌬— | H | 0.11 |

(a)Inherent viscosities ($\eta_{inh}$, in dL/g) were measured in DMF as in Example 1.

EXAMPLE 6

In situ Formation of Potassium 1,3-bis(dithiocarbamato)propane and Polymerization with 4,4'-Bis(chloroacetyl)diphenyl Ether 1,3-Propylene diamine (0.74 g, 0.01 mol), potassium acetate (2.0 g, 0.02 mol), and carbon disulfide (2.2 g, 0.03 mol) in DMF (50 ml) were stirred at 0° C. for 1 hour, then a solution of 4,4'-bis(chloroacetyl)diphenyl ether (3.23 g, 0.01 mol) in DMF (50 ml) was added and stirring continued for 48 hours at 25° C. The solution was then poured into cold water (500 ml) to precipitate the polymer which was filtered, washed with water and finally ethanol. The polymer was suspended in ethanol (50 ml) containing concentrated hydrochloric acid (5 ml) and the mixture refluxed for 2 hours. The polymer was collected by filtration, washed with ethanol and dried overnight at 50° C. under vacuum (less than 1 torr). Yield: 4.3 g. Spectroscopic analysis confirmed the presence of the desired poly(thiazolinethione).

Various modifications and alterations of this invention will become apparent to those skilled in the art without departing from the scope and spirit of this invention, and it should be understood that this invention is not to be unduly limited to the illustrative embodiments set forth herein.

We claim:

1. A polymer having incorporated in its backbone thiazolinethione heterocyclic units having the formula

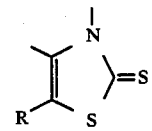

wherein
R is H or an alkyl or an alkoxyalkyl group of 1 to 20 carbon atoms, or an aryl, aralkyl, alkaryl, or alkoxyaryl group of 6 to 20 carbon atoms.

2. A polymer comprising heterocyclic units having at least one formula selected from the group consisting of

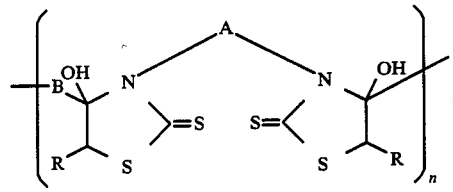

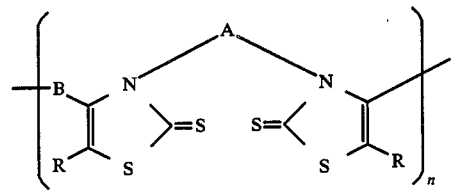

and

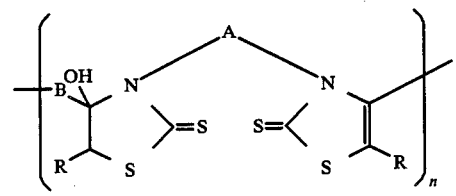

wherein
A and B independently are any divalent organic bridging group,

R is H or an alkyl or an alkoxyalkyl group of 1 to 20 carbon atoms, or an aryl, aralkyl, alkaryl, or alkoxyaryl group of 6 to 20 carbon atoms, and n is an integer of 3 to 100.

3. The polymer according to claim 2 wherein A and B independently are an alkylene group having 2 to 20 carbon atoms or an arylene group having 6 to 20 carbon atoms.

4. The polymer according to claim 3 wherein said alkylene or arylene groups are interrupted by 1 to 5 nonconnected heteroatoms of oxygen, nitrogen, silicon, or sulfur.

5. The polymer according to claim 3 wherein said arylene group has the formula

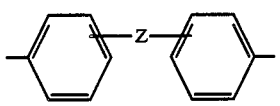

wherein Z represents a single bond or Z is, —O—, —S—, —SO$_2$—,

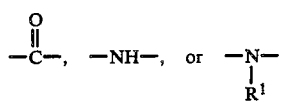

wherein R$^1$ is C$_1$ to C$_4$ alkyl.

6. The polymer according to claim 2 comprising units of the formula

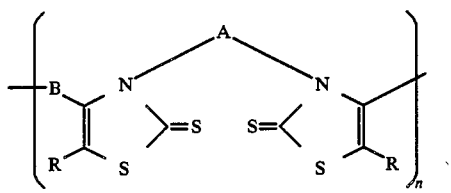

wherein A, B, R, and n are as defined in claim 2.

7. The polymer according to claim 2 comprising units of the formula

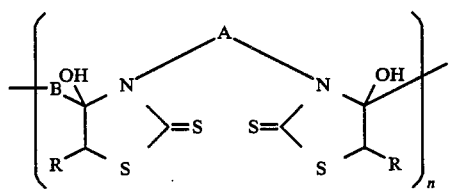

wherein A, B, R, and n are as defined in claim 2.

8. The polymer according to claim 2 comprising units of the formula

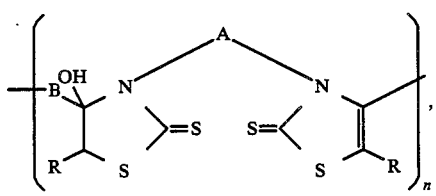

wherein A, B, R, and n are as defined in claim 2.

9. The polymer according to claim 2 wherein A is an alkylene group having 2 to 20 carbon atoms.

10. The polymer according to claim 9 wherein said alkylene group is dimethylene, trimethylene, tetramethylene, hexamethylene, octamethylene, or dodecamethylene.

11. The polymer according to claim 2 wherein B is an arylene group having 6 to 20 carbon atoms.

12. The polymer according to claim 11 wherein said arylene group is para,para'-biphenylene, para,para'-sulfonyldiphenylene or para,para'-oxydiphenylene.

13. The polymer according to claim 2 wherein R is hydrogen, methyl, ethyl, hexyl, octyl, dodecyl, or phenyl.

14. The polymer according to claim 2 wherein R is hydrogen.

15. A method comprising the steps:

(a) reacting a bis(dithiocarbamate salt) having the formula

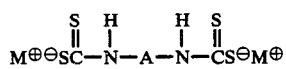

with a bis(alpha-haloketone) having the formula

wherein

A and B independently are any divalent organic bridging group,

M is a monovalent ion,

X is a bromine or chlorine atom, and

R is H or an alkyl or an alkoxyalkyl group of 1 to 20 carbon atoms, or an aryl, aralkyl, alkaryl, or alkoxyaryl group of 6 to 20 carbon atoms to form a polymer containing units selected from the group consisting of 4-hydroxythiazolidine-2-thione, thiazolinethione, and a combination 4-hydroxythiazolidine-2-thione/thiazolinethione; and (b) isolating the resulting polymer.

16. The method according to claim 15 further comprising the steps of:

(c) dehydrating the polymer of step (b) with acid to provide a poly(thiazolinethione), and (d) isolating the resulting poly(thiazolinethione).

17. A method comprising the steps:

(a) reacting a diamine with carbon disulfide, an alkali metal carboxylic acid salt, and a bis(alpha-haloketone) having the formula

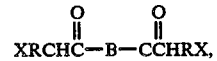

wherein

B is any divalent organic bridging group,

X is a bromine or chlorine atom, and

R is H or an alkyl or an alkoxyalkyl group of 1 to 20 carbon atoms, or an aryl, aralkyl, alkaryl, or alkoxyaryl group of 6 to 20 carbon atoms, to form a polymer containing units selected from the group consisting of 4-hydroxythiazolidine-2-thione, thiazolinethione, and a combination 4-hydroxythiazolidine-2-thion/thiazolinethione; and (b) isolating the resulting polymer.

18. The method according to claim 17 further comprising the steps of:
(c) dehydrating the polymer of step (b) with acid to provide a poly(thiazolinethione), and
(d) isolating the resulting poly(thiazolinethione).

* * * * *